Aug. 30, 1966    T. Y. QUIMBY ETAL    3,269,586
OPENER AND HANDLE FOR A BEVERAGE CONTAINER
Filed Aug. 3, 1964
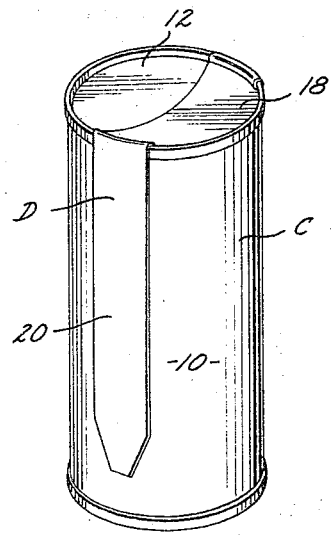
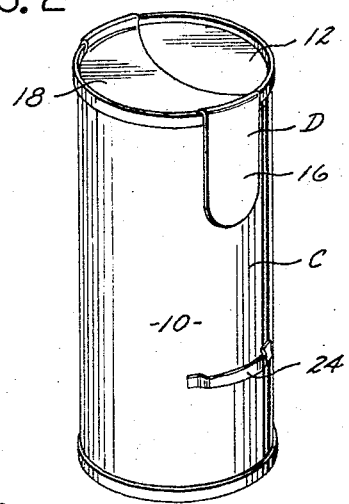
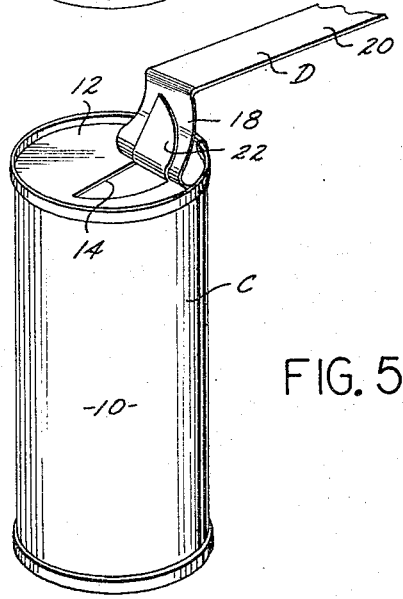
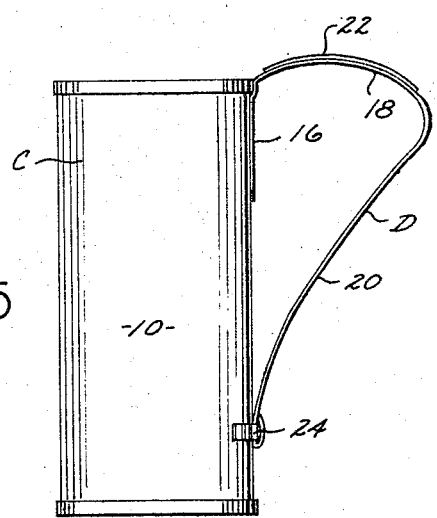
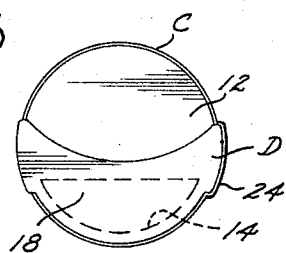
INVENTORS.
TERRY Y. QUIMBY
RICHARD B. WELLS
BY Fulwider, Patton, Rieber,
Lee and Utecht
ATTORNEYS United States Patent Office 3,269,586
Patented August 30, 1966

3,269,586
OPENER AND HANDLE FOR A BEVERAGE
CONTAINER
Terry Y. Quimby, 846 S. Basetdale, La Puente, Calif., and
Richard B. Wells, 3713 Locust, Long Beach, Calif.
Filed Aug. 3, 1964, Ser. No. 386,826
5 Claims. (Cl. 220—54)

The present invention relates generally to the art of packaging and more particularly to a combined opener and handle for use with a container for a beverage such as beer, soft drinks or the like.

Beverages such as beer, soft drinks or the like are usually chilled before being consumed. Accordingly, it is desirable to hold the beverage container by a handle rather than by grasping it directly with the fingers. In this way the container may be employed as a glass and no other drinking vessel need be utilized.

It is a major object of the present invention to provide a combined opener and handle for a beverage container which first forms an opening in the lid of the container and is thereafter bent into the configuration of a handle for the container.

Another object of the present invention is to provide a device of the aforedescribed nature which may be economically produced by conventional mass production methods.

Yet another object of the present invention is to provide a device of the aforedescribed nature which when formed into a handle converts the container into an attractive and unique-appearing drinking vessel.

It is an additional object of the present invention to provide a combined opener and handle for a beverage container which does not require the use of any tools whatsoever.

Yet a further object of the present invention is to provide a device of the aforedescribed nature which will afford a positive air-tight seal for the lid of the container so that the contents of the container will not be exposed to air and therefore spoilage.

These and other objects and advantages of the present invention will become apparent from the following detailed description, when taken in conjunction with the appended drawings wherein:

FIGURE 1 is a perspective view showing a beverage container provided with a combined opener and handle device that embodies the present invention;

FIGURE 2 is a perspective view similar to FIGURE 1, but showing the opposite side of said container;

FIGURE 3 is a top plan view of the container of FIGURES 1 and 2;

FIGURE 4 is a perspective view showing said device and container as said device is being utilized to open said container; and FIGURE 5 is a side elevational view of said container showing said device after it has been employed to open said container and has been configured into a handle therefor.

Referring to the drawings, the combined opener and handle device D embodying the present invention is utilized in conjunction with a beverage container C. The container C is of generally cylindrical configuration having vertical side walls 10 and a horizontal lid 12. As indicated in FIGURES 3 and 4, the lid 12 is formed with a generally semi-circular opening 14.

The combined opener and handle device D is of generally elongated metallic construction and includes a first vertical portion 16 secured to the upper part of the side wall 12 at one side of the opening 14. The upper end of this first vertical portion 16 is contiguous with one side of a horizontal portion 18. The horizontal portion 18 is of generally semi-cylindrical configuration, as will be apparent by reference to FIGURE 3. The opposite side of the horizontal portion 18 is contiguous with the upper end of a second vertical portion 20 which extends downwardly along the container side wall 10 opposite the first vertical portion 16.

As indicated particularly in FIGURE 4, the underside of the horizontal portion 18 may be provided with a plug 22 that normally fits within the lid opening 14 and has its sides initially sealingly engaged therewith. Conveniently, the lid 12 will be formed of a soft metal such as aluminum. The plug 22 may then intially be an integral part of the lid 12, with its outline being scored in the material from which the lid is formed.

Referring now to FIGURE 4, when it is desired to consume the contents of the container C, the lower end of the second vertical portion 20 is raised upwardly away from its side of the container. Thereafter, this second vertical portion 20 is moved in an arc towards the opposite side of the container whereby the horizontal portion 18 is peeled from the lid 12. As this operation occurs, the plug 22 of the lid 12 is withdrawn from the lid opening 14.

Referring now to FIGURE 5, the free end of the second vertical portion 20 is then urged downwardly and through a horizontal bracket 24 affixed to the beverage side wall 10 below the first vertical portion 16. The second vertical strip portion 20 and the horizontal portion 18 will then cooperate to define a handle which may be grasped by a person wishing to consume the contents of the container C.

It will be apparent that the exact means utilized to seal the lid opening 14 may be varied. Also, the form of the bracket 24 may be changed. If, in fact, the device D is formed of sufficiently rigid material it may not be necessary to provide the bracket 24. Also, it is possible to eliminate the first vertical portion 16 of the device D and rigidly affix the right-hand end of the horizontal portion 18 to the corresponding end of lid 12.

Various other modifications and changes may be made without departing from the spirit of the present invention or the scope of the following claims.

We claim:

1. In a beverage container having a vertical side wall and a horizontal lid formed with an opening, a combined opener and handle, that includes, a generally elongated strip having a first vertical portion secured to the upper part of said side wall, a horizontal portion contiguous with the upper end of said first vertical portion and sealingly extending across the opening in said lid, and a second vertical portion contiguous with the end of said horizontal portion opposite said first vertical portion, said second vertical portion initially extending downwardly along said side wall opposite said first vertical portion, with the lower end of the second vertical portion of said strip being movable from its initial position upwardly and over the side of said container to remove the horizontal portion of said strip from said lid opening, and the free end of said second vertical portion being thereafter bent downwardly whereby said second vertical portion and said horizontal portion cooperate to define a handle for said container.

2. In a beverage container having a vertical side wall and a horizontal lid formed with an opening, a combined opener and handle, that includes,
a generally elongated strip having a first vertical portion secured to the upper part of said side wall, a horizontal portion contiguous with the upper end of said first vertical portion and sealingly extending across the opening in said lid, and a second vertical portion contiguous with the end of said horizontal portion opposite said first vertical portion, said second vertical portion initially extending downwardly along said side wall opposite said first vertical portion;

and securing means formed on said side wall below the first vertical portion of said strip, with the lower end of the second vertical portion of said strip being movable from its initial position upwardly and over the side of said container to remove the horizontal portion of said strip from said lid opening, and the free end of said second vertical portion being thereafter engaged with said securing means whereby said second vertical portion and said horizontal portion cooperate to define a handle for said container.

3. In a beverage container having a vertical side wall and a horizontal lid formed with an opening, a combined opener and handle, that includes, a generally elongated strip having a first vertical portion secured to the upper part of said side wall, a horizontal portion contiguous with the upper end of said first vertical portion and sealingly extending across the opening in said lid, and a second vertical portion contiguous with the end of said horizontal portion opposite said first vertical portion, said second vertical portion initially extending downwardly along said side wall opposite said first vertical portion;

and a bracket secured to said side wall below the first vertical portion of said strip, with the lower end of the second vertical portion of said strip being movable from its initial position upwardly and over the side of said container to remove the horizontal portion of said strip from said lid opening, and the free end of said second vertical portion being thereafter engaged with said bracket whereby said second vertical portion and said horizontal portion cooperate to define a handle for said container.

4. In a beverage container having a vertical side wall and a horizontal lid formed with an opening, a combined opener and handle, that includes, a generally elongated strip having a first vertical portion secured to the upper part of said side wall, a horizontal portion contiguous with the upper end of said first vertical portion and having a plug normally disposed within said opening in said lid, and a second vertical portion contiguous with the end of said horizontal portion opposite said first vertical portion, said second vertical portion initially extending downwardly along said side wall opposite said first vertical portion;

and a bracket secured to said side wall below the first vertical portion of said strip, with the lower end of the second vertical portion of said strip being movable from its initial position upwardly and over the side of said container to remove said plug from within the lid opening, and the free end of said second vertical portion being thereafter engaged with said bracket whereby said second vertical portion and said horizontal portion cooperate to define a handle for said container.

5. In a beverage container having a vertical side wall and a horizontal lid formed with an opening, a combined opener and handle, that includes, a generally elongated strip having a first portion secured to the upper part of one side of said container, a horizontal portion contiguous with said first portion and sealingly extending across the opening in said lid, and a vertical portion contiguous with the end of said horizontal portion opposite said first portion, said vertical portion initially extending downwardly along said side wall opposite said first portion, with the lower end of the vertical portion of said strip being movable from its initial position upwardly and over the side of said container to remove the horizontal portion of said strip from said lid opening, and the free end of said vertical portion being thereafter bent downwardly whereby said vertical portion and said horizontal portion cooperate to define a handle for said container.

No references cited.

LOUIS G. MANCENE, *Primary Examiner.*

G. T. HALL, *Assistant Examiner.*